Figure 1:
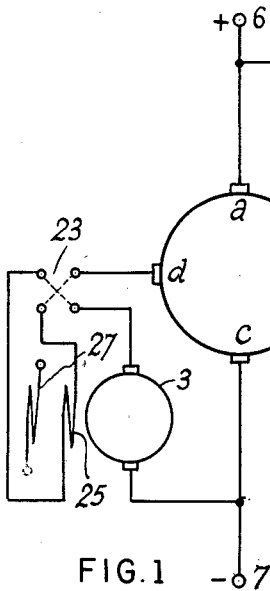

April 21, 1953  J. M. PESTARINI  2,636,152
MULTIPLE MOTOR SYSTEM
Filed Sept. 21, 1946  2 SHEETS—SHEET 1

INVENTOR
Joseph M. Pestarini
BY
ATTORNEY

April 21, 1953  J. M. PESTARINI  2,636,152
MULTIPLE MOTOR SYSTEM
Filed Sept. 21, 1946  2 SHEETS—SHEET 2

INVENTOR
Joseph M. Pestarini
BY
Philip G. Hilbert
ATTORNEY

Patented Apr. 21, 1953

2,636,152

UNITED STATES PATENT OFFICE 2,636,152

MULTIPLE MOTOR SYSTEM

Joseph Maximus Pestarini, Staten Island, N. Y.

Application September 21, 1946, Serial No. 698,494

6 Claims. (Cl. 318—140)

This invention relates to a system comprising a plurality of electric motors operating at voltages maintaining a constant ratio.

There are many situations where a plurality of electric motors must operate under the same difference of potential and yet they must absorb currents which must be maintained at a given ratio.

The motors considered here may be connected in parallel to the same terminals or they may be submitted to the same difference of potential and yet be connected to different terminals. The latter case occurs when the said motors are energized by a single metadyne but are inserted in different loops of the said metadyne.

In conventional multiple motor systems energized by the same difference of potential, a slight difference of the counter electromotive force induced in the motors results in a large and injurious discrepancy in the intensity of current. Accordingly an object of this invention is to provide a multiple motor system wherein each motor absorbs practically the desired value of current independently of large differences in construction and in conditions of operations of the motors. A further object of the invention is to reduce the weight of conductors in the motor windings and the sizes of the switchgear controlling the operation of the system.

The invention consists essentially in means for creating in each motor a corrective exciting flux which adjusts the counter electromotive force at the necessary value for keeping the currents at the desired ratio.

In one form of this invention an amplifier metadyne supplies the field excitation of each motor. The amplifier metadyne includes a member of its secondary variator winding traversed by a current equal or proportional to the current of the corresponding motor and inducing in the said motor a counter electromotive force opposing the said current.

In another form of the invention, dynamo electric machines known as Theta motor metadynes replace conventional dynamos.

The metadyne here often mentioned is a direct current machine having more than two brushes per cycle, the flux created by the current traversing the armature through a pair of brushes inducing an electromotive force between the brushes of another pair of same cycle.

The number of cycles of an electric machine is defined as the number of repetitions of the disposal of all electric and mechanical parts of the machine as seen by an observer accomplishing a complete circumference of the air gap.

The metadyne has been described in many United States patents of the same inventor, see for instance, Patents Nos. 2,055,240; 1,987,417; 2,038,380; 2,049,389; 2,079,465; a more complete description has been given in Revue Generale de l'Electricite, on March 8th and 15th, August 16th and 23rd, November 22nd and 29th and December 6th, 1930.

The armature currents of the metadyne are controlled by the ampere turns created by stator windings referred to as variator windings of the metadyne.

The amplifier metadyne is a specific form of metadyne generating a current with an intensity equivalent to a linear combination of given currents traversing the various members of a stator winding of the said metadyne, which is referred to as secondary variator winding. The amplifier metadyne is particularly described in the United States patent, 2,112,604.

The Theta motor metadyne is a dynamo electric machine described in the United States patent application, Serial No. 698,372, filed September 20, 1946. Such a machine comprises essentially an armature having associated therewith a commutator with a pair of primary brushes and a pair of secondary brushes displaced therefrom, the secondary brushes being short circuited, together with a stator winding having its magnetic axis coincident with the commutating axis of the primary brushes. The current traversing the short circuited secondary brushes excites the machine and induces an electromotive force between the primary brushes. Such electromotive force is in opposition to the power current supplied to the machine and is proportional thereto. The stator winding is adapted to be energized for controlling the intensity of said power current.

The invention will be better understood with the aid of the following description of some of its application, reference being made to the attached drawings.

Figure 2:
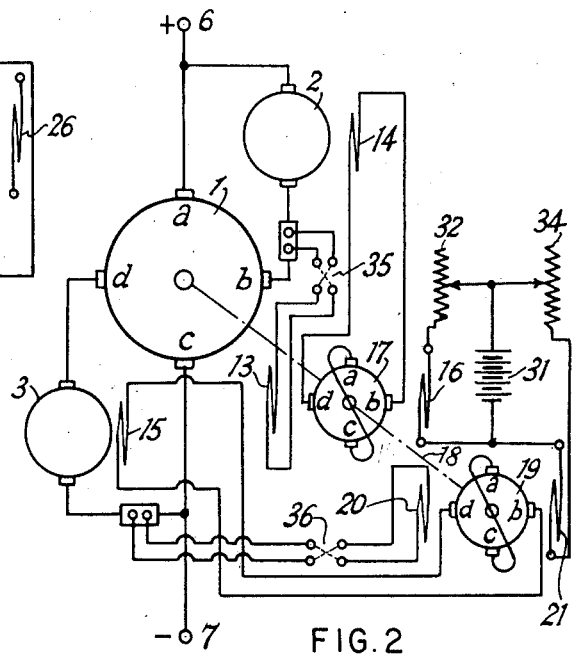
Figure 3:
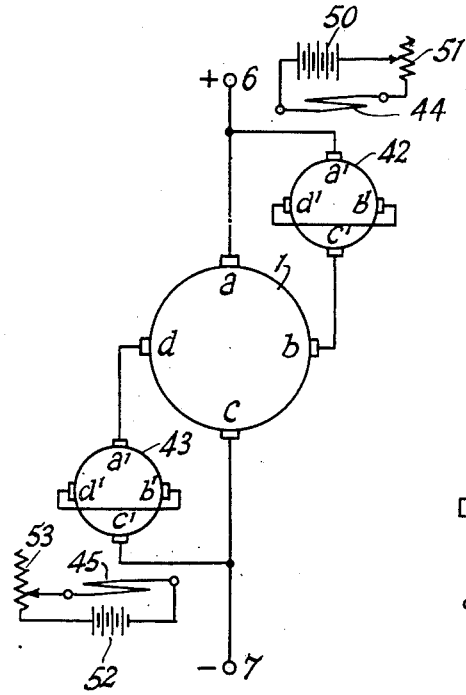
Figure 4:
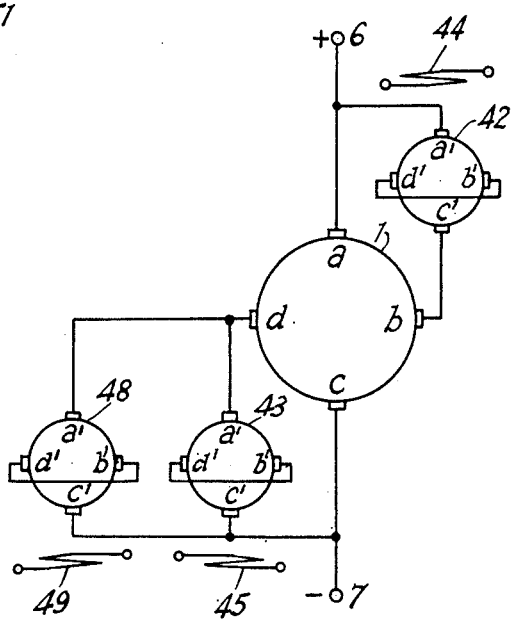
Figure 5:
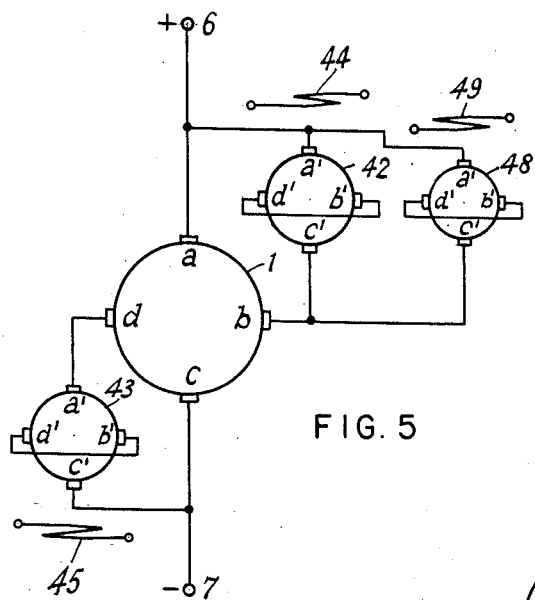
Figure 6:
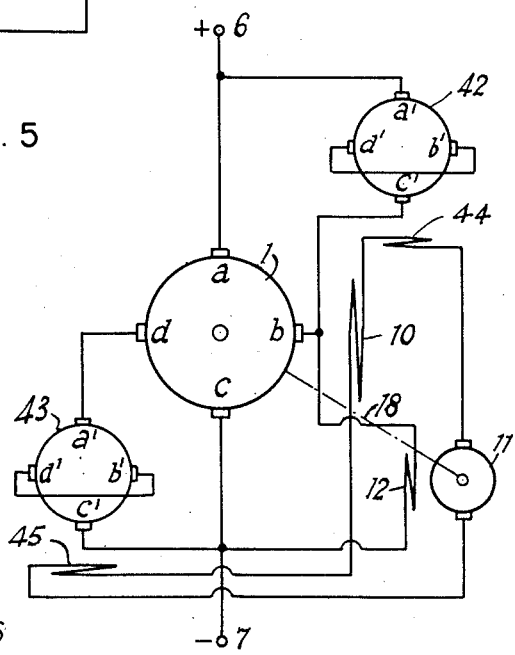

Figure 1 shows a scheme of a transformer metadyne supplying current to two dynamos, each of them being inserted in a different loop. Figure 2 shows the scheme of the same system, with dynamos excited by amplifier metadynes. Figure 3 shows a scheme of a transformer metadyne with Theta motor metadynes inserted in its loops. Figure 4 shows a variant of the arrangement illustrated by Figure 3. Figure 5 shows a further variant of the same arrangement. Figure 6 shows an arrangement of a metadyne energizing motors in two separate loops with variator windings connected in series.

Figure 7:
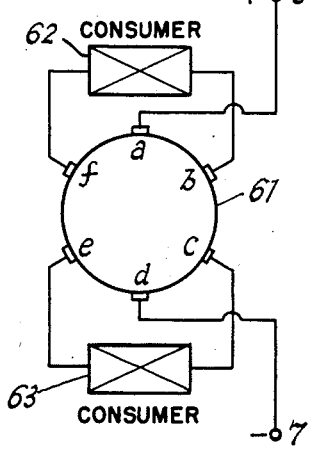

Fig. 7 shows another form of metadyne energizing consumers in separate loops.

Figure 1 shows a transformer metadyne 1 having a set of primary brushes a, c and a set of secondary brushes b, displaced therefrom. The primary brushes a and c are connected to a source of direct current by terminals 6 and 7. A motor 2 inserted in one loop of the metadyne is connected to the brushes a and b. A motor 3 inserted in the other loop is connected to the brushes c and d. In order to cause the motors 2 and 3 to absorb the same power current, they are provided with series windings 24 and 25 respectively, inducing in the respective armatures an electromotive force opposing the power current. When the motors must revolve in the opposite direction, the series windings must be reversed and for this purpose two reversing switches, 22 and 23 are provided. In addition to the series windings, the motors 2, 3 are provided with windings 26 and 27 respectively. The windings 26, 27 may be separately excited or shunt excited, providing for the control of the operation of the motors.

According to the present invention, as shown in Figure 2, each of the motors 2, 3, is excited by a single field winding 14, 15 respectively. Each field winding is energized by separate amplifier metadynes 17, 19, which are driven by the metadyne shaft 18. The amplifier metadyne 17 supplies current to the field winding 14 of the motor 2. The amplifier metadyne 19 supplies current to the field winding 15 of the motor 3. The secondary variator winding of the amplifier metadyne 17 has members 13, 16. The member 16 is separately excited by a source of current 31 and is controlled by rheostat 32. The member 13 of said variator winding is traversed by a fraction of the power current of the motor 2, inducing in the latter an electromotive force opposing the power current. The amplifier metadyne 19 supplies current to the field winding 15 of the motor 3 and includes in its secondary variator winding a member 20 and a member 21. The member 21 creates in association with source of current 31 a number of ampere turns controlled by a rheostat 34. The second member 20 is traversed by a fraction of the power current flowing through the motor 3, inducing in the latter an electromotive force opposing the current.

For reversing the direction of the ampere turns created by the coils 13 and 20, small switchgear 35 and 36 suffice.

The transformer metadyne referred to above is often used in electric traction systems as shown in Patent No. 1,987,417, Fig. 3. In order to keep the current balanced in its two loops, great care must be taken to provide in each loop, motors operating under the same conditions and of identical construction.

According to the invention, Theta motor metadynes are inserted in the loops. It is not then necessary to have the said Theta motor metadynes operating under the same conditions, for instance, at exactly the same speed.

In Figure 3 there is shown a transformer metadyne 1, in one loop of which a Theta motor metadyne 42 is inserted through its primary brushes a', c', while in the other loop another Theta motor metadyne 43 is inserted through its primary brushes a', c'. The current absorbed by the Theta motor metadyne 42 is controlled by the ampere turns of its primary stator winding 44, through the rheostat 51 inserted in the circuit of the source of current 50. The current absorbed by the motor 43 is controlled by the ampere turns of its primary stator winding 45 through the rheostat 53 inserted in the circuit of the source of current 52. If an equal current in each loop is desired, the operator must balance equally the ampere turns in the windings 44 and 45 by suitable control of the rheostats 51 and 53.

Figure 4 shows a scheme with a single Theta motor metadyne 42 inserted in one loop of the metadyne 1 and with Theta motor metadynes 43 and 48 connected in parallel inserted in the other loop. In order to obtain balanced currents in the two loops, it suffices to control primary stator windings 44, 45 and 49 of the respective Theta motor metadynes so that the motor metadynes 43 and 48 absorb together the same current as the Theta motor metadyne 42. This example shows the utility of the present invention in the case of a locomotive equipped with four motors which has one of its motors out of service.

Figure 5 shows another example of the invention. In one loop of a transformer metadyne 1 a single Theta motor metadyne 43 is inserted while in the other loop are inserted two Theta motor metadynes 42 and 48, of different size. Thus a locomotive may be equipped with motors of different power which may be operated to absorb a current proportional to their rated power.

For the sake of simplicity the rheostats and the sources of current applicable to the primary stator windings 44, 45 and 49 have not been shown in Figures 4 and 5.

The difference of current absorbed by two Theta motor metadynes creates a supplementary current flowing between the secondary short circuited brushes b', d', which in its turn induces an electromotive force between the primary brushes, a', c', of the Theta motor metadyne tending to equalize the current absorbed by the primary brushes of the said motors.

In order to minimize the difference of the characteristics of the Theta motor metadyne and of the transformer metadyne, the same controlling current may transverse the stator windings of the said metadynes as shown in Figure 6. Accordingly the current delivered by an auxiliary dynamo 11 traverses simultaneously series connected stator windings 44, 10 and 45.

As shown in Figure 6, the current of the transformer metadyne 1 is controlled by its secondary stator winding 10. Inserted in the loops of metadyne 1 are Theta motor metadynes 42 and 43. The current of the motor metadynes 42 and 43 is controlled by the ampere turns of primary stator windings 44 and 45 respectively. Current is supplied to the series connected stator windings 44, 10 and 45 by means of an auxiliary dynamo 11. The dynamo 11 includes for example a field winding 12 which is shunt connected across the brushes b and c of the transformer metadyne 1. The auxiliary dynamo is shown mechanically coupled on the shaft 18 of the transformer metadyne 1 as the latter generally rotates at a constant speed.

The Theta motor metadynes of the schemes considered above are traversed by currents of the same intensity or by different currents having a constant ratio of intensity. The operation is the same in both cases.

The transition of the Theta motor metadyne from motoring to regenerating is obtained simply by inverting the ampere turn of their primary stator windings, as indicated by the arrows in dotted lines, in Fig. 6. No modification whatever is needed of the circuits traversed by the power currents.

The invention herein described applies to any form of metadyne having more than one loop as shown in Figure 7 wherein the metadyne 61 has two loops in which the consumers 62 and 63 are inserted.

The transformer metadyne 61 includes brushes *a, b, c, d, e* and *f* and provides for two loops. The consumer 62 is inserted in one loop, being connected to the brushes *b* and *f*. The other consumer 63 is inserted in the other loop, connected to the brushes *c* and *e*. The terminals 6 and 7 are connected to the remaining brushes *a* and *d*.

It will thus be seen that there is provided a plurality of direct current motors operating under voltages maintaining a given ratio and absorbing currents of a desired ratio of intensity and further means are provided for controlling these currents, in which the several objects of this invention are achieved.

As various possible embodiments might be made of the above described invention, and as various changes might be made in the embodiments set forth, it is to be understood that all matter herein set forth or shown in the accompanying drawings, is to be interpreted as illustrative and not in a limited sense.

Having particularly described and ascertained the nature of my invention, and in what manner the same is to be performed, I declare that what I claim is:

1. In an electric system comprising a plurality of dynamo machines operating under voltages maintained at a constant ratio, means for distributing the power current among the said machines consisting in providing each of said machines with an excitation winding supplied with current by an amplifier metadyne, the intensity of said metadyne current being controlled by secondary stator windings of the said amplifier metadynes, one of the said stator windings being traversed by a current proportional to the power current of the corresponding dynamo and inducing in the latter an electromotive force opposing the said power current.

2. In an electric system comprising a metadyne having a plurality of loops and a plurality of dynamos, each of said dynamos being inserted in different loops of said metadyne, means for distributing the power current among said dynamos consisting in providing an amplifier metadyne for supplying excitation current to the excitation winding of each of said dynamos, the intensity of said excitation current being controlled by secondary stator windings of said amplifier metadynes, one of the said stator windings being traversed by a current proportional to the power current of the corresponding dynamo and inducing in the latter an electromotive force opposing the said power current.

3. An electric system comprising a plurality of dynamo electric machines, each machine including a pair of primary brushes, a pair of short circuited secondary brushes displaced therefrom and a stator winding having its magnetic axis coincident with the commutating axis of said primary brushes, dynamo electric means in circuit with the primary bushes of said machines for supplying power at voltages maintained at a constant ratio, and means for energizing each of said stator windings to provide a flux along the primary commutating axis of said machine, the flux due to the armature reaction of said machine along the primary commutating axis thereof creating an electromotive force opposing the power current, said fluxes being in aiding relation when said machines are motoring and being in opposed relation when said machines are regenerating.

4. An electric system comprising a transformer metadyne including a pair of primary brushes for connection to a source of direct current and a pair of secondary brushes displaced relative to said primary brushes, each of said primary brushes and one of said secondary brushes providing a loop, at least one dynamo electric machine connected in each of said loops, each dynamo electric machine comprising a pair of primary brushes for connection in the loop, a pair of short circuited secondary brushes displaced from said last mentioned pair of primary brushes, and a stator winding having its magnetic axis coincident with the commutating axis of said last mentioned primary brushes, and means for energizing said stator winding with a regulated current for controlling the intensity of the power current traversing said last mentioned primary brushes.

5. An electric system as in claim 4, wherein said transformer metadyne further includes a stator winding having its magnetic axis coincident with the commutating axis of the secondary brushes of said transformer metadyne, said last mentioned stator winding being connected in series with said first mentioned stator winding.

6. In an electric system comprising a plurality of direct current machines, dynamo means having a plurality of outputs respectively in circuit with said machines for energizing said machines with voltages maintained at a constant ratio, means for distributing the power current among said machines comprising excitation means for each of said machines, each of said excitation means including a component for providing a main exciting flux and a component for providing a corrective exciting flux for adjusting said main flux to a value proportional to said power current.

JOSEPH MAXIMUS PESTARINI.

References Cited in the file of this patent

UNITED STATES PATENTS

| Number | Name | Date |
| --- | --- | --- |
| 1,969,699 | Pestarini | Aug. 7, 1934 |
| 1,987,417 | Pestarini | June 8, 1935 |
| 2,049,389 | Pestarini | July 28, 1936 |
| 2,138,666 | Pestarini | Nov. 29, 1938 |
| 2,138,667 | Pestarini | Nov. 29, 1938 |
| 2,282,874 | Moore | May 12, 1942 |

FOREIGN PATENTS

| Number | Country | Date |
| --- | --- | --- |
| 16,510 | France | Dec. 10, 1912 |